T. C. NIXON.
MECHANISM FOR REDUCING GRAIN TO FILAMENTOUS FORM.
APPLICATION FILED APR. 23, 1910.

1,106,962.

Patented Aug. 11, 1914.

3 SHEETS—SHEET 1.

Witnesses
Stuart Hilder.
Frances M. Anderson.

Inventor
Thomas C. Nixon
by E. W. Anderson
his Attorneys

T. C. NIXON.
MECHANISM FOR REDUCING GRAIN TO FILAMENTOUS FORM.
APPLICATION FILED APR. 23, 1910.

1,106,962.

Patented Aug. 11, 1914.
3 SHEETS—SHEET 2.

Witnesses
Stuart Hilder.
Frances M. Anderson.

Inventor
Thomas C. Nixon
by E. W. Anderson & Son
his Attorneys

T. C. NIXON.
MECHANISM FOR REDUCING GRAIN TO FILAMENTOUS FORM.
APPLICATION FILED APR. 23, 1910.
1,106,962.
Patented Aug. 11, 1914.
3 SHEETS—SHEET 3.
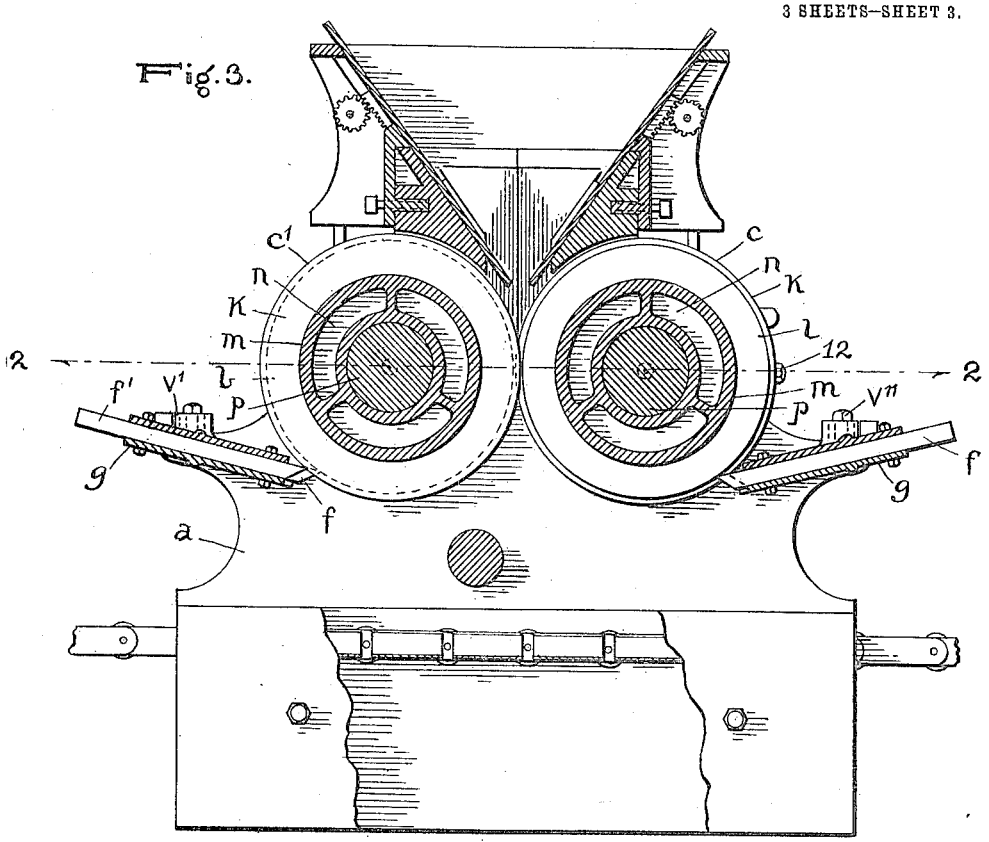
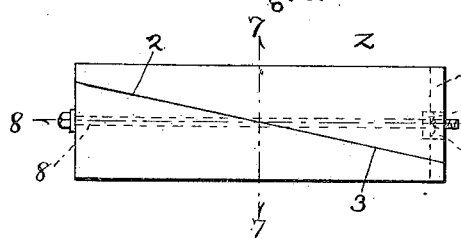
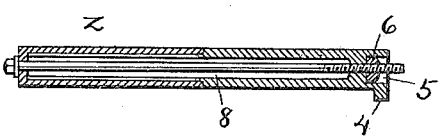
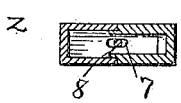
Witnesses
Stuart Hilder.
Frances W. Anderson
Inventor
Thomas C. Nixon
by E. W. Anderson Jr.
his Attorneys

UNITED STATES PATENT OFFICE.

THOMAS C. NIXON, OF CHICAGO, ILLINOIS.

MECHANISM FOR REDUCING GRAIN TO FILAMENTOUS FORM.

1,106,962. Specification of Letters Patent. Patented Aug. 11, 1914.

Application filed April 23, 1910. Serial No. 557,296.

*To all whom it may concern:*

Be it known that I, THOMAS C. NIXON, a citizen of the United States, and resident of the city of Chicago, in the county of Cook and State of Illinois, have made a certain new and useful Invention in Mechanism for Reducing Grain to Filamentous Form; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
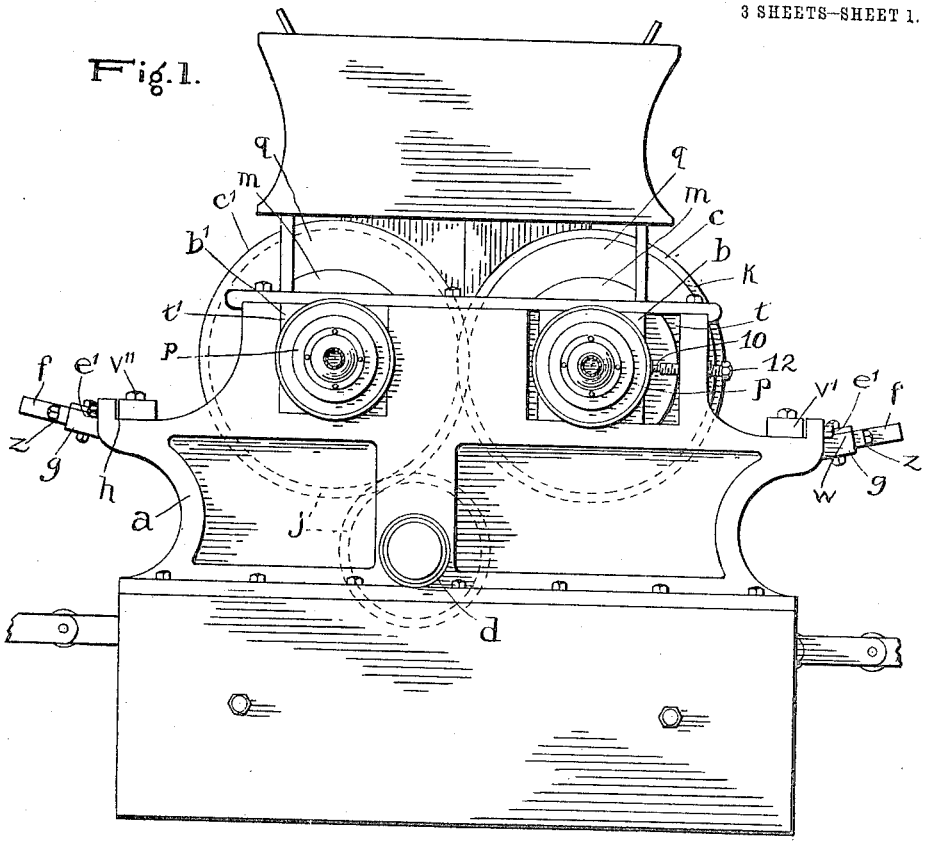
Figure 4:
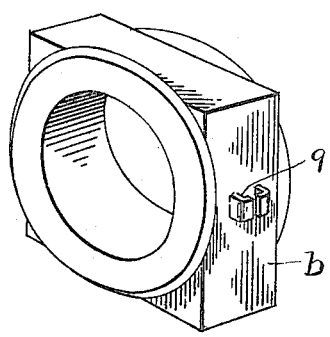
Figure 2:
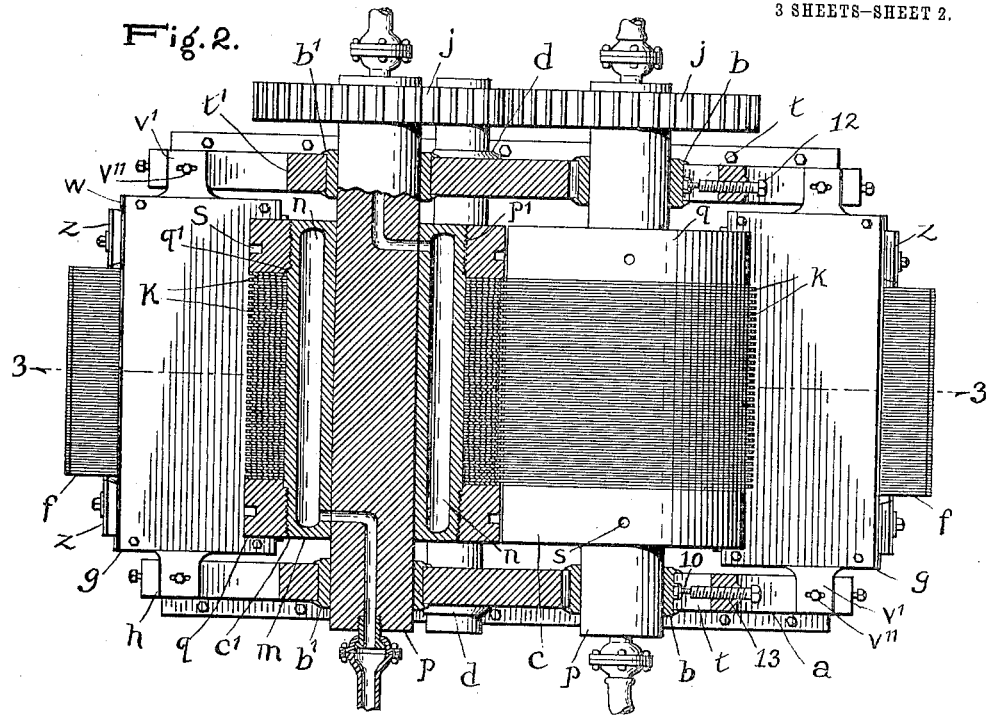
Figure 5:
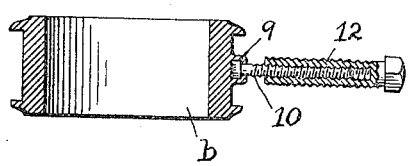

Figure 1, is a side view of mechanism showing the invention. Fig. 2, is a horizontal sectional view of the same. Fig. 3, is a vertical longitudinal sectional view. Fig. 4, is a perspective view of an adjustable journal box. Fig. 5, is a horizontal sectional view of the same. Fig. 6, is a plan view showing wedge clamp for scrapers. Fig. 7, is a vertical sectional view of the same. Fig. 8, is a transverse sectional view.

The invention relates to mechanism for reducing substances to filament form, and particularly to machines for reducing cereals to threads or filaments of continuous character and small size; and the invention consists in the novel construction and combinations of parts as hereinafter set forth.

In the accompanying drawings, illustrating the invention, the letter $a$, designates framework, having recesses $t$, and $t'$, for the bearings $b$, and $b'$, in which are seated the journals of the reducing or shredding rolls $c$, and $c'$. The bearing $b$, is designed to be adjustable toward or from the bearing $b'$. The bearing for the power shaft is indicated at $d$. The rolls $c$, and $c'$, constitute an operative set or pair, usually driven by power in opposite directions through intermeshing gear wheels $j$, $j$. The rolls have each a series of circumferential cylinder-edge cutter disks which work in the channels between the cutter disks of the opposite roll to cut, draw in, compress and elongate the grain into continuous threads or filaments which are discharged from the grooves of each roll by means of thin blades $f$, secured in a holding-stock $g$, which is seated on bearings $h$, of said frame. The rolls $c$, and $c'$, are similar. Each roll consists of a number of thin annular disks $k$, and $l$, of the same thickness, made from rolled or hammered and polished steel, being usually made from sheets of saw steel of about one twenty-fourth of an inch in thickness for fine threads. While the eyes of these disks are of similar size, being designed to fit the sleeve $m$, on which they are seated, the disks are of different diameters, the cutting disks $k$, being about one-eighth of an inch larger in diameter than the intervening bottoming disks $l$. When the disks are compressed together on the sleeve $m$, in series of alternating cutter disks and smaller disks, circumferential grooves of fine character are provided between the cutter disks in which the marginal portions of the hardened and polished sides of the larger disks form the sides of the grooves, and the cylindriform edges of the smaller disks form the bottoms of the grooves. In this way the cylindriform cutting edges of the disks are designed to be formed of the hard vertical sides of the steel plates, and tend to keep themselves keen.

The sleeve $m$, on which the disks are seated is designed to be made of soft steel, and is usually provided with an air-space or passage $n$, between its circumferential portion and the eye portion which is seated on the steel shaft $p$. The peripheral surface of each sleeve is ground true and parallel to the surface of the shaft on which it is secured. The ends of the sleeve are threaded as indicated at $p'$, to receive the end collars $q$, which are provided with slight internal lap-shoulders $q'$, to cover the screw thread and prevent contact of the disks therewith. These collars are threaded and are designed to compress and hold the disks solidly together on the sleeves, and those of the drive roll $c'$, are designed to be of the same diameter as the cutting disks, while the collars of the adjustable roll $c$, are of the diameter of the intermediate smaller disks. By this construction these thin disks are solidly braced at their circumferential portions, in such wise as to obviate spreading or deflection of their margins, which would not only interfere with the cutting action, but would also result in crevices, tending to destroy the clean and sanitary character of the roll. Spanner holes $s$, are provided in the perimeters of these collars for the application of a wrench, so that they have the character of nuts in compressing the disks together.

In order to provide clearance for the cutter disks $k$, both these cutter disks and the smaller disks are dipped in alcohol containing a small percentage—say two per cent.—of gum-shellac, or gum-sandras before they are seated on the shaft of the roll. The cutter disks of one roll will then pass into the channels of the opposite roll, and as the perimeter of each cutter disk $k$, is cylindriform and has hardened cutting edges, the grain, fed between the rolls, will be cut and drawn into filaments, and such filaments will be of continuous character, being formed by the rolls in a continuous manner, or so long as the grain is fed thereto and the rolls are in action. The alcoholic film between the disks serves also to close any microscopic crevices which might otherwise be present, and insures that condition of cleanliness which is requisite in work of this character. In the operation of these rolls, the grain, properly prepared, in the usual manner is fed between the rolls, is cut and drawn into the channels between the cutter disks, and is there compressed and elongated into threads or filaments which are discharged from the channels or grooves upon a receiving hand below by means of the thin steel blades $f$, which have the same thickness as the disks. For each roll, a series of such discharging blades is provided, such blades alternating with thin intermediate strips $f'$, which are shorter than the discharging blades, being designed to work in contact with the peripheral edges of the cutter disks, not only to clear these edges of fragmentary matter, but also to aid in keeping their cutting edges true and keen, and to prevent the angular ends of the discharging blades from having a grinding pressure against the intermediate or bottoming disks. These blades and strips are compressed together and held in bank or comb form by means of an adjustable head or stock $g$, the end lugs $v'$, of which are seated on and secured to the bearings $h$, of the frame. These end lugs are provided with slots through which securing screws $v''$ pass. Set screws $e'$, seated in the walls of the bearings $h$, engage the lugs of the stock, and the bank of discharging blades is in this way provided with means of adjustment. The head or stock is provided at each end with a screw compressing device $z$, which is designed not only to hold the blades and strips in solid contact but also to afford means for readily removing any or all of these blades and strips should it become advisable. With this view the end of the stock is made with a flange $w$, between which and the end blade or strip of the series is seated the compression device $z$. This compression device is of elongated form, having parallel sides, and it is designed to press evenly along the side of the bank of discharging blades and strips, and consists of two elongated rectangular wedges, whereof the inclined planes are in opposition as indicated at 2, and 3. One of these wedges is provided with an end flange or catch 4, to engage the edge of the stock or head, and it has a seat 5, in which is placed a nut 6, which is kept from turning by said seat. The opposite or co-working wedge is provided with an aperture 7, through which passes a bolt 8, which engages said nut. When the bolt is turned in one direction the movable wedge is moved inward and forces the device laterally against the series of blades and strips, thereby compressing the same solidly together. When the bolt is turned in the opposite direction, loosening the compression, any of the blades or strips can be adjusted to the work, or can be removed for repair or replacement. Because of the hardened vertical sides of the cutter disks, the cutting edges of their perimeters have a self-sharpening tendency designed to lessen the necessity for their removal.

The filaments or threads, to which this machine is designed to reduce the grain, are designed to be substantially of rectangular form in cross-section, and may be made of larger or smaller size by the use of a micrometric adjusting device which operates in connection with the adjustable journal bearing $b$. To this end the bearing is provided with a seat 9, for engagement with the head of a micrometer screw 10, which engages the threaded bore of a second micrometer screw 12, which engages a threaded bearing 13, in the framework. The pitch of the exterior thread of the latter screw may be about twenty to the inch, that of the former micrometer screw being about thirty to the inch. By means of these micrometer connecting screws the bearings $b$, can be adjusted toward or from the bearings $b'$, with great nicety and precision, so that the margins of the cutter disks will enter more or less into the channels between opposite disks and will be held positively in adjusted position, approximating more or less the intermediate or bottoming disks. Very thin ribbon-like filaments can in this way be produced, or they can be made of larger size in cross-section. The passage $n$, in the sleeve of the roll is designed to provide for the circulation of air, hot or cold, as may be advisable. When the grain is reduced to filaments in this manner, it tends to lose some of its flavoring and volatile elements, and in order to avoid this as much as possible, the rolls may be heated by passing hot air through them, in such wise as to form a slight superficial cover on the filament, designed to prevent such elements from escaping. For this purpose, gas, steam or air of suitable temperature may be carried through the shaft and directed into the passage in the sleeve.

What I claim as my invention and desire to secure by Letters Patent is:

1. In a reducing machine, a cutting roll composed of a series of thin cutter disks, each having plane sides terminating in parallel cutting edges, between each two cutter disks a removable disk of equal thickness to the cutter disk and of smaller diameter, a threaded shaft upon which the disks are secured, means of clearance between each disk and the next, and compression collars of substantially the same diameter as the disk at each end of the series and serving to brace the disks at their peripheral portions.

2. A composite cutting roll, comprising a series of removable thin cutter disks each having plane sides terminating in parallel cutting edges, smaller alternating removable disks of substantially equal thickness to the cutter disks and serving as the bottoms of the fine circumferential channels, compression collars of the same diameter as the disk at each end of the series, and a threaded shaft on which the disks and collars are located.

3. In a reducing machine, a threaded shaft, thereon a series of removable thin cutter disks each having plane sides terminating in parallel cutting edges, alternating smaller removable disks of equal thickness to said cutter disks and compression collars of substantially equal diameter to the disks at the ends of the series, an adjustable shaft parallel to said shaft, thereon a similar series of similar removable cutter disks having cutting engagement with the cutter disks of the first named series, similar smaller alternating disks, and similar compression collars and independent means at each end of the series for moving the cutter disks of one series toward the edges of the smaller disks of the other series.

4. In a reducing machine, a circumferentially channeled roll having a series of thin plane cutter disks each terminating in a rectangular cutting edge, alternating smaller disks of substantially equal thickness to said cutter disks, compression collars of substantially the same diameter as the disks at each end of the series, and a series of removable discharging blades adapted to enter the channels of the roll.

5. In a reducing machine, a circumferentially channeled roll and parallel thereto an adjustable head, a series of removable discharging blades adapted to enter the channels of the rolls, alternating removable elongated strips adapted to hold said blades in parallel relation and to engage the edges of the cutter disks, and a parallel-sided parallel-motion clamp, engaging the series of discharging blades and strips, attached to said head.

6. In composite reducing rolls, a shaft, thin cylinder-edged cutting disks, alternating smaller thin disks of equal thickness to said cutting disks, and compression collars of substantially the same diameter as the end disks, secured on said shaft, said collars serving to brace the circumferential cutting portions of the disks.

7. In a composite reducing roll machine, a shaft, a series of thin cylinder-edged cutting disks, alternating smaller thin disks of equal thickness to said cutting disks, and compression collars of substantially the same diameter as the end disks, secured on said shaft, a parallel shaft having a series of similar cutting disks engaging the first named cutting disks, smaller alternating disks and compression collars of substantially equal diameter to the end disks, movable boxes for the journals of one of said shafts, and independent means of adjustment engaging each movable box and serving to move the cutting disks toward each other to increase the engagement, said means also serving to adjust the cutting disks to greater distance.

In testimony whereof I affix my signature, in presence of two witnesses.

THOMAS C. NIXON.

Witnesses:
 CHARLES O. SHERVEY,
 FANNIE F. RICHARDS.

---

Copies of this patent may be obtained for five cents each, by addressing the "Commissioner of Patents, Washington, D. C."